(12) United States Patent
Simpson (10) Patent No.: US 10,150,875 B2
(45) Date of Patent: *Dec. 11, 2018

(54) SUPERHYDROPHOBIC POWDER COATINGS

(71) Applicant: UT-BATTELLE, LLC, Oak Ridge, TN (US)

(72) Inventor: John T. Simpson, Clinton, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 469 days.

This patent is subject to a terminal disclaimer.

(21) Appl. No.: 13/631,212

(22) Filed: Sep. 28, 2012

(65) Prior Publication Data

US 2014/0094540 A1    Apr. 3, 2014

(51) Int. Cl.
| | |
|---|---|
| *C09D 5/16* | (2006.01) |
| *C08K 7/24* | (2006.01) |
| *C09D 5/03* | (2006.01) |
| *C08K 7/26* | (2006.01) |
| *C09D 7/62* | (2018.01) |

(52) U.S. Cl.
CPC .............. *C09D 5/1681* (2013.01); *C08K 7/24* (2013.01); *C08K 7/26* (2013.01); *C09D 5/031* (2013.01); *C09D 7/62* (2018.01)

(58) Field of Classification Search
CPC ............................... C08K 7/24; C09D 5/1681
USPC ................................................. 523/200, 212
See application file for complete search history.

(56) References Cited

U.S. PATENT DOCUMENTS

| | | |
|---|---|---|
| 3,931,428 A | 1/1976 | Reick |
| 4,326,509 A | 4/1982 | Usukura |
| 5,086,764 A | 2/1992 | Gilman |
| 5,154,928 A | 10/1992 | Andrews |
| 5,258,221 A | 11/1993 | Meirowitz et al. |
| 5,458,976 A | 10/1995 | Horino et al. |
| 5,733,365 A | 3/1998 | Halko et al. |
| 6,040,251 A | 3/2000 | Caldwell |
| 6,360,068 B1 | 3/2002 | Kinoshita et al. |
| 6,384,293 B1 | 5/2002 | Marcussen |
| 6,410,630 B1 | 6/2002 | Hoover et al. |
| 6,512,072 B1 | 1/2003 | Gantner et al. |
| 6,528,220 B2 | 3/2003 | Yoshida et al. |
| 6,743,842 B1 | 6/2004 | Fukagawa et al. |
| 6,800,412 B2 | 10/2004 | Sugiyama et al. |
| 6,887,636 B2 | 5/2005 | Matsuda et al. |
| 6,916,301 B1 | 7/2005 | Clare |
| 6,936,390 B2 | 8/2005 | Nanya et al. |
| 7,020,899 B1 | 4/2006 | Carlopio |
| 7,098,145 B2 | 8/2006 | Fukushima et al. |
| 7,110,710 B2 | 9/2006 | Yamashita et al. |
| 7,129,013 B2 | 10/2006 | Higuchi et al. |
| 7,150,904 B2 | 12/2006 | D'Urso et al. |
| 7,258,731 B2 | 8/2007 | D'Urso et al. |
| 7,265,256 B2 | 9/2007 | Artenstein |
| 7,638,182 B2 | 12/2009 | D'Urso et al. |
| 7,707,854 B2 | 5/2010 | D'Urso et al. |
| 7,744,953 B2 | 6/2010 | Huang et al. |
| 7,754,279 B2 | 7/2010 | Simpson et al. |
| 8,216,674 B2 | 7/2012 | Simpson et al. |
| 9,539,149 B2 * | 1/2017 | Simpson ............... A61F 13/022 |
| 2002/0016433 A1 | 2/2002 | Keller et al. |
| 2002/0164419 A1 | 11/2002 | Fukushima et al. |
| 2003/0013795 A1 | 1/2003 | Nun et al. |
| 2004/0037961 A1 | 2/2004 | Dieleman et al. |
| 2004/0067247 A1 | 4/2004 | De Sloovere et al. |
| 2005/0009953 A1 | 1/2005 | Shea |
| 2005/0010154 A1 | 1/2005 | Wright et al. |
| 2005/0136242 A1 | 6/2005 | Yahiaoui et al. |
| 2006/0008678 A1 | 1/2006 | Fukushima et al. |
| 2006/0019042 A1 | 1/2006 | Nojima et al. |
| 2006/0024508 A1 | 2/2006 | D'Urso et al. |
| 2006/0113618 A1 | 6/2006 | Reboa |
| 2006/0246277 A1 | 11/2006 | Axtell et al. |
| 2007/0184247 A1 | 8/2007 | Simpson et al. |
| 2008/0286556 A1 | 11/2008 | D'Urso et al. |
| 2008/0296252 A1 | 12/2008 | D'Urso et al. |
| 2009/0042469 A1 | 2/2009 | Simpson |
| 2010/0004373 A1 | 1/2010 | Zhu et al. |
| 2010/0021745 A1 | 1/2010 | Simpson et al. |

(Continued)

FOREIGN PATENT DOCUMENTS

| | | |
|---|---|---|
| CN | 101575478 A | 11/2009 |
| CN | 101838496 A | 9/2010 |

(Continued)

OTHER PUBLICATIONS

International Search Report dated Apr. 16, 2014 in PCT Application No. PCT/US2013/052659. (9 pages).
International Search Report dated Apr. 16, 2014 in PCT Application No. PCT/US2013/052662. (10 pages).
Whelan, Tony, Polymer Technology Dictionary, pub. 1994, Chapman & Hall, pp. 395.
Faulde et al., Toxic and behavioural effects of different modified diatomaceous earths on teh German cockroach, J. Stored Prod. Res., vol. 42, No. 3, pp. 253-263 (Jan. 1, 2006).
Bankovic et al., Obtention of selective membranes for water and hydrophobic liquids by plasma enhanced chemical vapor deposition on porous substrates, Mat. Sci. & Eng. B, vol. 112, No. 2-3, pp. 165-170 (Sep. 25, 2004).

(Continued)

*Primary Examiner* — Vickey Nerangis
(74) *Attorney, Agent, or Firm* — Fox Rothschild LLP (57) ABSTRACT

A superhydrophobic coating, comprises a superhydrophobic powder with superhydrophobic particles having a three dimensional nanostructured surface topology defining pores, and a resin. The superhydrophobic particles are embedded within the resin and the resin does not fill the pores of the superhydrophobic particles such that the three dimensional surface topology of the superhydrophobic particles is preserved. A precursor powder for a superhydrophobic coating and a method for applying a superhydrophobic coating to a surface are also disclosed.

20 Claims, 1 Drawing Sheet

(56) References Cited

U.S. PATENT DOCUMENTS

| | | |
|---|---|---|
| 2010/0286582 A1 | 11/2010 | Simpson et al. |
| 2011/0195181 A1 | 8/2011 | Jin et al. |
| 2012/0088066 A1 | 4/2012 | Aytug et al. |
| 2012/0088092 A1 | 4/2012 | Simpson et al. |

FOREIGN PATENT DOCUMENTS

| | | |
|---|---|---|
| DE | 19950106 A1 | 4/2001 |
| EP | 0171168 A2 | 2/1986 |
| EP | 0507634 | 7/1992 |
| EP | 0927748 A1 | 7/1999 |
| EP | 1479738 | 11/2004 |
| EP | 2426179 | 3/2012 |
| FR | 20030003932 | 3/2003 |
| GB | 1154835 A | 6/1969 |
| WO | 0002967 | 1/2000 |
| WO | 2004111648 A3 | 12/2004 |
| WO | 2006091235 | 8/2006 |
| WO | 2008085052 | 7/2008 |
| WO | 2009012116 | 1/2009 |
| WO | 2013042052 | 3/2013 |
| WO | 2013071212 | 5/2013 |

OTHER PUBLICATIONS

Dolley, Diatomite, U.S. Geological Survey Minerals Yearbook, pp. 24.1 24.6 (1999).

Yuan et al., The hydroxyl species and acid sites on diatomite surface: a combined IR and Raman study, App. Surface Sci., 227, pp. 30-39 (2004).

3M, Nexcare Bandages, http://solutions.3m.com/wps/portal/3M/en_CA/Nexcare/Home/Products/ Bandages/Waterproof/, printed Aug. 28, 2009.

Coulson et al., Ultralow Surface Energy Plasma Polymer Films, Chem. Mater,. vol. 12, pp. 2031-2038 (2000).

* cited by examiner

SUPERHYDROPHOBIC POWDER COATINGS

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates to superhydrophobic materials, and more particularly to superhydrophobic coatings.

BACKGROUND OF THE INVENTION

Superhydrophobic coatings are typically only superhydrophobic at the coating's outer surface. Once the outer surface is abraded away, the surface is no longer superhydrophobic. This loss of superhydrophobicity is due to the superhydrophobic particles or structure being removed from the surface. Particles that are beneath the surface generally have their nanopores and nanotextured surfaces clogged with the underlying coating material.

In a standard electrostatic powder spraying process, dry resin powder, is electrostatically sprayed onto a given electrically grounded substrate. The electrically charged dry powder adheres to the grounded substrate by electrostatic forces. When the dry resin powder is cured, it becomes well bonded to the substrate.

SUMMARY OF THE INVENTION

A superhydrophobic coating can include a superhydrophobic powder with superhydrophobic particles having a three dimensional nanostructured surface topology defining pores, and a resin. The superhydrophobic particles can be embedded within the resin. According to certain embodiments, the resin does not completely fill the pores of the superhydrophobic particles, such that the three dimensional surface topology of the superhydrophobic particles is preserved.

The superhydrophobic particles can comprise a hydrophobic coating. The hydrophobic coating can conform to the surface of the superhydrophobic particle so as to preserve the nanostructured surface topology of the particle. The superhydrophobic particle can comprise a diatomaceous earth particle. Diatomaceous earth particles have a nanostructured surface topology. When, according to various embodiments, a diatomaceous earth particle is coated with a hydrophobic coating, the diatomaceous earth particle can retain its nanostructured surface topology even after being coated with the hydrophobic coating. According to various embodiments, any or all of the super hydrophobic particles can have a porous core. The porous core of the superhydrophobic particles can be hydrophilic. Diatomaceous earth is an example of a porous core that is naturally hydrophilic. The porous core of the superhydrophobic particles can be a silicate. The silicate can be etched to provide the nanostructured surface topology.

The resin into which the superhydrophobic particles are embedded can be hydrophobic. A variety of polymers can be used as the resin. As used herein, the term "resin" means any solid or liquid synthetic or naturally occurring organic polymer and is not limited to materials obtained from naturally occurring exudations from certain plants.

The pore volume of the superhydrophobic particle can be less than 50% filled by the resin. The diameter of the superhydrophobic particle can be between 0.1-20 μm or between 1 and 20 μm. The diameter of the superhydrophobic particles can be between 10-20 μm. For purposes of the present application, the term "pore volume" refers to a fraction of the volume of voids over the total volume of a particle. The term "pore volume" as used herein means the same as "porosity" or "void diffraction." The pore volume can be expressed as either a fraction, between 0 and 1, or as a percentage, between 0 and 100%. The pore volume of a particle can be measured by any known method including direct methods, optical methods, computed tomography methods, imbibition methods, water evaporation methods, mercury intrusion porosimetry, gas expansion methods, thermoporosimetry, and cryoporometric methods.

The ratio of superhydrophobic particles to resin can be between 1:4 and 1:20 by volume, between 1:5 and 1:7 by volume, between 1:1 and 1:4 by volume, or between 1:1.5 and 1:2.5 by volume. For example, the ratio of superhydrophobic particles to resin can be about 1:6 by volume or about 1:2 by volume.

A precursor powder for a superhydrophobic coating can include a superhydrophobic powder having superhydrophobic particles and a plurality of resin particles. The superhydrophobic particles have a three dimensional surface topology comprising pores. The resin particles can include a resin material, which is capable, when cured, of surrounding and embedding the superhydrophobic particles, while not completely filling the pores of the superhydrophobic particles.

The diameter of the resin particles can be between 1-100 μm. According to certain embodiments, the diameter of the resin particles can be larger than the pore size of the superhydrophobic particles, but generally not more than 20 times the diameter of the superhydrophobic particles. According to certain embodiments, the diameter of the resin particles can be larger than the pore size of the superhydrophobic particles, but generally not more than 4 times the diameter of the superhydrophobic particles. The diameter of the resin particles can be larger than average pore size of the superhydrophobic particles, but generally not more than 10 times the diameter of the superhydrophobic particles. According to other embodiments, the diameter of the resin particles can be larger than average pore size of the superhydrophobic particles, but generally not more than 2 times the diameter of the superhydrophobic particles.

A method for applying a superhydrophobic coating to a surface can include the steps of providing a precursor powder for a superhydrophobic coating. The precursor powder can have a plurality of superhydrophobic particles. The superhydrophobic particles can have a three dimensional surface topology comprising pores. The precursor powder also can include a plurality of resin particles. The resin particles can include a resin material that is capable, when cured, of surrounding and embedding the superhydrophobic particles within the resin, but not completely filling the pores of the superhydrophobic particles. The precursor powder can be applied to the surface. The resin can be cured to bond the resin to the surface and to surround and/or to embed the superhydrophobic particles in the resin.

The resin can be hydrophobic. The superhydrophobic particle can include a porous core material and a hydrophobic coating. The hydrophobic coating can conform to the surface of the porous core material so as to preserve the nanostructured surface topology. The porous core material can be hydrophilic.

The porous core material can include a silicate. The silicate can be etched to provide a nanostructured surface topology. The porous core material can include diatomaceous earth. The pore volume of the superhydrophobic particle can be less than 50% filled by the resin. The diameter of the superhydrophobic particle can be between 0.1-20 μm or about 1 μm. The diameter of the superhydrophobic particles can be between 10-20 μm. The ratio of superhydrophobic particles to resin can be between 1:4 and 1:20 by volume or between 1:1 and 1:4 by volume. The ratio of superhydrophobic particles to resin can be between 1:5 and 1:7 by volume or between 1:1.5 and 1:2.5 by volume. The ratio of superhydrophobic particles to resin can be about 1:6 by volume or about 1:2 by volume. A layer of resin particles can be applied to the surface prior to applying the precursor powder to the surface. The precursor powder can be applied to the surface by an electrostatic spraying process.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

According to various embodiments a superhydrophobic coating can include a superhydrophobic powder with superhydrophobic particles and a resin. The superhydrophobic particles can have a three dimensional nanostructured surface topology defining pores. The superhydrophobic particles can be embedded within the resin, such that at least some of the superhydrophobic particles are completely enveloped by or surrounded by the resin. As used herein the term "embedded" means to enclose firmly in a surrounding mass. The term "embedded" therefore includes not only particles that are completely surrounded or enveloped by the resin but also particles that are only partially enveloped, enclosed, or surrounded in the surrounded resin. According to various embodiments, a superhydrophobic coating can include a plurality of superhydrophobic particles that includes some completely embedded particles and some partially embedded particles. The completely embedded particles reside entirely within a resin layer such that they are surrounded on all sides by resin. The partially embedded particles have portions of their surface area protruding beyond the resin layer's surface. The protruding, partially embedded, particles can impart superhydrophobicity to the surface of the coating. The completely embedded particles allow the coating to remain superhydrophobic even after the surface of the coating is abraded or sanded away. When the surface of the coating is abraded or sanded away some or all of the partially embedded particles can be removed, but some or all of the completely embedded particles can be exposed at the surface of the coating. The exposed particles can then function to impart superhydrophobicity to the surface of the coating.

One reason that the completely embedded particles are able to maintain their superhydrophobicity once they are exposed to the surface after sanding or abrading is that despite being completely embedded within the resin, the resin does not completely fill the pores or completely cover the superhydrophobic particles. Since the resin does not completely fill the pores or completely cover the superhydrophobic particles, the three dimensional surface topology of the superhydrophobic particles is preserved. The resin can be capable of being melted and blended with the superhydrophobic (SH) particles without completely filling the pores of the superhydrophobic particles and/or without covering all of the nanotextured surfaces of the superhydrophobic particles. According to certain embodiments, the superhydrophobic particles can repel the resin to preserve a volume of air within the porous core of each superhydrophobic particle. The degree to which the resin does fill the pores of the superhydrophobic particles shall be defined in more detail hereinafter.

Various embodiments describe how to modify existing electrostatic spray powder coating techniques such that the resulting coating is well-bonded, durable, and superhydrophobic (SH). Various embodiments combine dry powder resins with superhydrophobic, nano-textured amorphous silica powder to form a well-bonded coating that is both superhydrophobic at the surface and is still superhydrophobic when the outer surface is abraded away, for example, by sending the outer surface.

Additional embodiments relate to a precursor powder comprising super hydrophobic particles and resin particles.

Superhydrophobic Particles

Each of the superhydrophobic particles can comprise a hydrophobic coating. The hydrophobic coating can conform to the surface of each superhydrophobic particle, so as to preserve the nanostructured surface topology.

Any or all of the superhydrophobic particles can include a porous core and/or a porous core material. The porous core and/or the porous core material can be hydrophilic. The porous core and/or the porous core material of the superhydrophobic particles can be a silicate. The silicate can be etched to provide the nanostructured surface topology. According to some embodiments the superhydrophobic particle can comprise one or more diatomaceous earth particles. The surface chemistry of the porous core and/or the porous core material can be changed from hydrophilic to hydrophobic by the application of a hydrophobic coating. The hydrophobic coating can conform to the surface of the porous core material, so as to preserve the nanostructured surface topology.

The diameter of any or all of the superhydrophobic particles and/or the average diameter of the superhydrophobic particles can be within a range having a lower limit and/or an upper limit. The range can include or exclude the lower limit and/or the upper limit. The lower limit and/or upper limit can be selected from 0.05, 0.1, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, and 25 μm at one atmosphere pressure. For example, according to certain preferred embodiments, the diameter of any or all of the superhydrophobic particles and/or the average diameter of the superhydrophobic particles can be from 0.1-20 μm, from 1-20 μm, or from 10-20 μm.

The pore volume of any or all of the superhydrophobic particles and/or the average pore volume of the superhydrophobic particles can be within a range having a lower limit and/or an upper limit. The range can include or exclude the lower limit and/or the upper limit. The lower limit and/or upper limit can be selected from 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, and 0.5 ml/g. For example, according to certain preferred embodiments, the pore volume of any or all of the superhydrophobic particles and/or the average pore volume of the superhydrophobic particles can be 0.1-0.3 ml/g.

The surface area of any or all of the superhydrophobic particles and/or the average surface area of any or all of the superhydrophobic particles can be within a range having a lower limit and/or an upper limit. The range can include or exclude the lower limit and/or the upper limit. The lower limit and/or upper limit can be selected from 0.5, 1, 5, 10, 15, 20, 25, 30, 35, 40, 45, 50, 55, 60, 65, 70, 75, 80, 85, 90, 95, 100, 105, 110, 115, and 120 $m^2/gm$. For example, according to certain preferred embodiments, the surface area of any or all of the superhydrophobic particles and/or the average surface area of any or all of the superhydrophobic particles can be 1-100 $m^2/gm$.

Differentially etched spinodal superhydrophobic powders are described in detail in U.S. Pat. No. 7,258,731 to D'Urso et al., issued on Aug. 21, 2007, which is hereby incorporated by reference in its entirety, and consists of nano-porous and nanotextured silica (once the borate has been etched away). Such differentially etched spinal superhydrophobic powders can be employed as the superhydrophobic particles according to various embodiments.

Superhydrophobic diatomaceous earth (SHDE) is described in detail U.S. Pat. No. 8,216,674 to Simpson et al., issued on Jul. 10, 2012), which is hereby incorporated by reference in its entirety. Such superhydrophobic diatomaceous earth particles can be employed as the superhydrophobic particles according to various embodiments.

Diatomaceous earth (DE) treated in excess of 650° C. undergoes material and structural changes which is deleterious to the silicate surface functionality to which the hydrophobic coating of the present invention is ultimately bound and at slightly higher temperatures is deleterious to the highly partitioned surface topography that enables superhydrophobic character when coated with a hydrophobic material. The surface of uncalcined DE is that of amorphous silica, more similar in composition to that of precipitated silica rather than pyrogenic silica. There is a reasonably high silanol content to the DE surface that can be characterized as having strong hydrogen bonded silanols, moderate strength hydrogen bonded silanols and weak hydrogen bonded silanols. Upon warming nearly all strongly hydrogen bonded silanols are lost when 650° C is reached, moderate strength hydrogen bonded silanols are lost when 1,000° C. is achieved and above 1,000° C. the weak hydrogen bonded silanols are lost. For the practice of the invention it is desirable that although surface bound water is reduced to a low level or completely removed, the presence of at least some moderate strength hydrogen bonded silanols is intended to provide sufficient sites for bonding of the coating layer and thereby stabilizing the hydrophobic self-assembly monolayer coating. For this reason calcined DE is generally avoided for the practice of the invention as most calcined DE has been treated in excess of 800° C. The desired surface topograghy formed by the diatoms and a sufficient amount of silanol functionality on the silicate surface to achieve the continuous self assembled monolayers (SAM) of the resent invention is generally unavailable with DE that is heat treated in excess of 800° C.

A non-exclusive list of exemplary SAM precursors that can be used for various embodiments of the invention is: $X_y$(CH$_3$)$_{(3-y)}$SiLR where y=1 to 3; X is Cl, Br, I, H, HO, R'HN, R'$_2$N, imidizolo, R'C(O)N(H), R'C(O)N(R''), R'O, F$_3$CC(O)N(H), F$_3$CC(O)N(CH$_3$), or F$_3$S(O)$_2$O, where R'is a straight or branched chain hydrocarbon of 1 to 4 carbons and R''is methyl or ethyl; L, a linking group, is CH$_2$CH$_2$, CH$_2$CH$_2$CH$_2$, CH$_2$CH$_2$O, CH$_2$CH$_2$CH$_2$O, CH$_2$CH$_2$C(O), CH$_2$CH$_2$CH$_2$C(O), CH$_2$CH$_2$OCH$_2$, CH$_2$CH$_2$CH$_2$OCH$_2$; and R is (CF$_2$)$_n$CF$_3$ or (CF(CF$_3$)OCF$_2$)$_n$CF$_2$CF$_3$, where n is 0 to 24. Preferred SAM presursors have y=3 and are commonly referred to as silane coupling agents. These SAM precursors can attach to multiple OH groups on the DE surface and can link together with the comsumption of water, either residual on the surface, formed by condensation with the surface, or added before, during or after the deposition of the SAM precursor. All SAM precursors yield a most thermodynamically stable structure where the hydrophobic moiety of the molecule is extended from the surface and establishes normal conformational populations which permit the hydrophobic moiety of the SAM to dominate the air interface. In general, the hydrophobicity of the SAM surface increases with the value of n for the hydrophobic moiety, although in most cases sufficiently high hydrophobic properties are achieved when n is about 4 or greater where the SAM air interface is dominated by the hydrophobic moiety. The precursor can be a single molecule or a mixture of molecules with different values of n for the perfluorinated moiety. When the precursor is a mixture of molecules it is preferable that the molecular weight distribution is narrow, typically a Poisson distribution or a more narrow distribution.

One example of a SAM precursor which can be used in an embodiment of the invention is tridecafluoro-1,1,2,2-tetrahydroctyltriclorosilane. This molecule undergoes condensation with the silanol groups of the DE surface releasing HCl to bond the tridecafluoro-1,1,2,2-tetrahydroctylsilyls group via Si—O covalent bonds to the surface of the heat treated DE. The tridecafluorohexyl moiety of the tridecafluoro-1,1,2,2-tetrahydroctylsilyl groups attached to the DE surface provide a monomolecular layer that has a hydrophobicity similar to polytetrafluoroethylene. Hence, by the use of such SAMs, the DE retains the desired partitioned surface structure while rendering that partitioned surface hydrophobic by directing the perfluorohexyl moiety to the air interface thereby yielding the desired superhydrophobic powder.

Resin

According to various embodiments, the resin can be hydrophobic. On example of a suitable hydrophobic resin is fluorinated ethylene propylene (FEP). Other embodiments can employ Ultra-violet (UV) curable resins, thermoset resins, and thermoplastic. UV curable resins are particularly preferred for certain purposes, because they can allow for the coating of various thermal sensitive substrates, such as plastics, waxes, or any material that might melt or soften at the curing temperature used for other resins. According to certain embodiments, it can be advantageous to use hydrophobic resins (like FEP) of electrostatic powder coat resins commercially available including, thermal set resins, thermal plastic resins, and UV curable resins. Combinations of various types of resins can also be employed.

Resins can include, but are not limited to, polypropylene; polystyrene; polyacrylate; polycyanoacrylates; polyacrylates; polysiloxanes; polyisobutylene; polyisoprene; polyvinylpyrrolidone; epoxy resins, polyester resins (also known as TGIC resins), polyurethane resins, polyvinyl alcohol; styrene block copolymers; block amide copolymers; amorphous fluoropolymer, such as that sold by E. I. du Pont de Nemours and Company ("DuPont") under the TEFLON AF® trademark; acrylic copolymer, alkyd resin mixtures, such as those sold by Rohm and Haas under the FASTRACK XSR® trademark, and copolymers and mixtures thereof.

The resins can include further components, including tackifiers, plasticizers and other components.

In general, the smaller the resin powder grain size, the more uniform the superhydrophobic powder dispersion. The same is true for the superhydrophobic powder grain size. It should be noted, however, that according to certain embodiments, if the resin grains become too small (<1 micron) it is more likely that the resins will begin to fill the pores of the superhydrophobic powder and cover up too much of the surface texture of the superhydrophobic powder.

Superhydrophobic powder grains can have a diameter within a range having a lower limit and/or an upper limit. The range can include or exclude the lower limit and/or the upper limit. The lower limit and/or upper limit can be selected from 10, 15, 20, 30, 40, 50, 60, 70, 80, 90, 100, 200, 300, 400, 500, 600, 700, 800, 900, 1000, 1500, 2000, 2500, 3000, 3500, 4000, 4500, 5000, 5500, 6000, 6500, 7000, 7500, 8000, 8500, 9000, 9500, 10000, 10500, 11000, 11500, 12000, 12500, 13000, 13500, 14000, 14500, 15000, 15500, 16000, 16500, 17000, 17500, 18000, 18500, 19000, 19500, 20000, 20500, 21000, 21500, 22000, 22500, 23000, 23500, 24000, 24500, and 25000 nm. For example, according to certain preferred embodiments, superhydrophobic powder grains can have a diameter within range of from 20 nm to 20 microns, or from 100 nm to 15 microns.

The diameter of the resin particles can be within a range having a lower limit and/or an upper limit. The range can include or exclude the lower limit and/or the upper limit. The lower limit and/or upper limit can be selected from 0.01, 0.05, 0.1, 0.5, 1, 2, 3, 4, 5, 10, 15, 20, 25, 30, 35, 40, 45, 50, 55, 60, 65, 70, 75, 80, 85, 90, 95, 100, 105, 110, 115, and 120 μm. For example, according to certain preferred embodiments, the diameter of the resin particles can be between 1-100 μm.

The diameter of the resin particles can be larger than the pore size of the superhydrophobic particles by a factor within a range having a lower limit and/or an upper limit. The range can include or exclude the lower limit and/or the upper limit. The lower limit and/or upper limit can be selected from 1, 10, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, and 5000. For example, according to certain preferred embodiments, the diameter of the resin particles can be larger than the pore size of the superhydrophobic particles by a factor within a range of from 1 to 5000. The resin particles could be as small as the silica pore size (~20 nm pore size) and as large as 5000 times as large as the pores (i.e. 100 microns).

The diameter of the resin particles can be larger than the diameter of the superhydrophobic particles by a factor within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, and 4.5. For example, according to certain preferred embodiments, the diameter of the resin particles can be larger than the diameter of the superhydrophobic particles by a factor within a range of from 0.1 to 4.

According to some embodiments, the diameter of the resin particles can be larger than the pore size of the superhydrophobic particles but generally not more than 20 times the diameter of the superhydrophobic particles. According to other embodiments the diameter of the resin particles can be larger than average pore size of the superhydrophobic particles but generally not more than 10 times the diameter of the superhydrophobic particles.

Composition of the Superhydrophobic Coating

The ratio of superhydrophobic particles to resin in the superhydrophobic coating, by volume can be selected from 1:1, 1:1.25, 1:1.5, 1:1.75, 1:2, 1:2.25, 1:2.5, 1:2.75, 1:3, 1:3.25, 1:3.5, 1:3.75, 1:4, 1:4.25, 1:4.5, 1:4.75, 1:5, 1:5.25, 1:5.5, 1:5.75, 1:6, 1:6.25, 1:6.5, 1:6.75, 1:7, 1:7.25, 1:7.5, 1:7.75, 1:8, 1:8.25, 1:8.5, 1:8.75, 1:9, 1:9.25, 1:9.5, 1:9.75, 1:10, 1:10.25, 1:10.5, 1:10.75, 1:11, 1:11.25, 1:11.5, 1:11.75, 1:12, 1:12.25, 1:12.5, 1:12.75, 1:13, 1:13.25, 1:13.5, 1:13.75, 1:14, 1:14.25, 1:14.5, 1:14.75, and 1:15. For example, according to certain preferred embodiments, the ratio of superhydrophobic particles to resin in the superhydrophobic coating can be between 1:1 and 1:10, by volume. The ratio of superhydrophobic particles to resin can be between 1:1.5 and 1:5, by volume. The ratio of superhydrophobic particles to resin can be about 1:4, by volume.

The pore volume of any or all of superhydrophobic particle that is filled by the resin can be within a range having a lower limit and/or an upper limit. The range can include or exclude the lower limit and/or the upper limit. The lower limit and/or upper limit can be selected from 0.1, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, and 60%. For example, according to certain preferred embodiments, the pore volume of any or all of superhydrophobic particle can be less than 50% filled by the resin.

Superhydrophobic powder grains, like superhydrophobic diatomaceous earth, are generally much lighter than resin grains of comparable size because of the superhydrophobic powder grain's high porosity and surface area. In addition, the superhydrophobic diatomaceous earth powder grains described in this invention are generally much smaller than the typical resin grains. For instance, resin grain sizes typically vary from about 30 microns to 100 microns in diameter, while superhydrophobic diatomaceous earth typically varies from 0.5 microns to 15 microns in diameter. This means that equal volumes of superhydrophobic diatomaceous earth and resin powder consist of considerably more SHDE grains and will contain much more resin by weight.

Precursor Powder

A precursor powder for a superhydrophobic coating comprises a superhydrophobic powder having superhydrophobic particles and a plurality of resin particles. The superhydrophobic particles can each have a three dimensional surface topology comprising pores. The resin particles can comprise a resin material, which, when cured, can be capable of embedding the superhydrophobic particles within the resin, but does not completely fill the pores of the superhydrophobic particles.

Superhydrophobic silicon dioxide (silica) nanoparticles can have a diameter within a range having a lower limit and/or an upper limit. The range can include or exclude the lower limit and/or the upper limit. The lower limit and/or upper limit can be selected from 0.1, 0.5, 1, 2, 3, 4, 5, 10, 15, 20, 25, 30, 35, 40, 45, 50, 55, 60, 65, 70, 75, 80, 85, 90, 95, 100, 105, 110, 115, 120, and 125 nm. For example, according to certain preferred embodiments, superhydrophobic silica nanoparticles can have a diameter of from 1 nm to 100 nm. Superhydrophobic silica nanoparticles are typically spherical or approximately spherical and have diameters of less than 100 nm in size. The silica particles can have a diameter that is as small as a few nanometers, but often conglomerate into compound particles microns in size.

The diameter of particle conglomerates can be within a range having a lower limit and/or an upper limit. The range can include or exclude the lower limit and/or the upper limit. The lower limit and/or upper limit can be selected from 100, 150, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, and 5500 nm. For example, according to certain preferred embodiments, the diameter of particle conglomerates can be from 200 nm to 5 microns.

Once the superhydrophobic particles and the resin particles are blended to form the precursor powder, the precursor powder can be directly sprayed (electrostatically) onto a substrate (usually a metal).

The substrate can then be preheated to a temperature within a range having a lower limit and/or an upper limit. The range can include or exclude the lower limit and/or the upper limit. The lower limit and/or upper limit can be selected from 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, and 300 degrees Fahrenheit. For example, according to certain preferred embodiments, the substrate can then be preheated to a temperature within a range of from 100 degrees Fahrenheit to 250 degrees Fahrenheit. This temperature range can correspond to the low end of the curing temperature range. The preheating step can allow the substrate to approach the curing temperature of the resin before the resin cures.

Once the substrate is within 1, 2, 3, 4, 5, 6, 7, 8, 9, or 10 degrees Fahrenheit of the curing temperature, the temperature can be elevated to the normal curing temperature range, which can be within a range having a lower limit and/or an upper limit. The range can include or exclude the lower limit and/or the upper limit. The lower limit and/or upper limit can be selected from 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, and 500 degrees Fahrenheit. For example, according to certain preferred embodiments, once the substrate is within 10 degrees Fahrenheit of the curing temperature, the temperature can be elevated to the normal curing temperature range, which can be from 250 degrees Fahrenheit to 450 degrees Fahrenheit. Once at curing range, the temperature can be held for a time period. The time period can be within a range having a lower limit and/or an upper limit. The range can include or exclude the lower limit and/or the upper limit. The lower limit and/or upper limit can be selected from 5, 6, 7, 8, 9, 10, 11, 12, 13, 14, 15, 16, 17, 18, 19, 20, 21, 22, 23, 24, 25, 26, 27, 28, 29, and 30 minutes. For example, according to certain preferred embodiments, the time period can be from about 10 to 15 minutes. Since the substrate is typically already at or near the curing temperature, this increase in temperature readily increases the substrate temperature and allows the resin to sufficiently bond to the substrate.

The superhydrophobic powder can be mechanically bonded to the resin, because the resin partially penetrates into its porous nanotextured structure during the curing process. If the powder work cured at the curing temperature without waiting for the substrate to warm up, the thermal mass of the substrate and insulation attributes of superhydrophobic particles, such as superhydrophobic diatomaceous earth, would prevent the substrate from heating up to the curing temperature before the resin cured. The result would be an unbonded superhydrophobic resin film that would simply fall off the substrate.

Application Process

A method for applying a superhydrophobic coating to a surface can include the steps of providing a precursor powder for a superhydrophobic coating. The precursor powder can have a plurality of superhydrophobic particles. The superhydrophobic particles can have a three dimensional surface topology comprising pores. The precursor powder can also include a plurality of resin particles. The resin particles can include a resin material that is capable, when cured, of embedding the superhydrophobic particles within the resin, but not filling the pores of the superhydrophobic particles or completely covering the particle surface. The precursor powder is applied to the surface. The resin is cured to bond the resin to the surface and to embed the superhydrophobic particles in the resin.

The precursor powder can be applied by a spray-on process.

The precursor powder can be applied by dipping a hot substrate into a blended resin/superhydrophobic powder that would cause the blend to coat and cure on the substrate. The hot substrate can be maintained at a temperature within a range having a lower limit and/or an upper limit. The range can include or exclude the lower limit and/or the upper limit. The lower limit and/or upper limit can be selected from 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, and 450 degrees Fahrenheit. For example, according to certain preferred embodiments, the hot substrate can be maintained at a temperature in a range of 200 degrees Fahrenheit to 400 degrees Fahrenheit for a time period. The time period can be within a range having a lower limit and/or an upper limit. The range can include or exclude the lower limit and/or the upper limit. The lower limit and/or upper limit can be selected from 5, 6, 7, 8, 9, 10, 11, 12, 13, 14, 15, 16, 17, 18, 19, 20, 21, 22, 23, 24, 25, 26, 27, 28, 29, and 30 minutes. For example, according to certain preferred embodiments, the time period can be from about 10 to 15 minutes.

Preheating the substrate can be important due to the thermal insulating effects of the superhydrophobic silica powder. The fact that the dry powder blend contains a thermally insulating silica powder (e.g. SHDE) means that it will likely be more difficult to get the substrate up to a temperature that promotes curing. If the substrate is prevented from reaching the curing temperature in the allotted curing time (because of the SH silica powder blend) then the coating might not adequately bond to the substrate.

The same type of coating/curing can be done with a hot substrate engulfed on a cloud of swirling powder. In this embodiment, the hot substrate can be maintained at a temperature within a range having a lower limit and/or an upper limit. The range can include or exclude the lower limit and/or the upper limit. The lower limit and/or upper limit can be selected from 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, and 450 degrees Fahrenheit. For example, according to certain preferred embodiments, the hot substrate can be maintained at a temperature in a range of 200 degrees Fahrenheit to 400 degrees Fahrenheit.

There are many possible variations for depositing the superhydrophobic powder. In a process having only one application step, the dry powder resin and superhydrophobic particles can be blended together. The superhydrophobic particles can be superhydrophobic diatomaceous earth (SHDE), but other nanostructured superhydrophobic powders can be used, such as silica nanoparticles, and differentially etched spinodal decomposed borosilicate glass powder. Mixtures of different types of superhydrophobic particles are also possible.

A layer of resin particles can be applied to the surface prior to applying the precursor powder to the surface. The precursor powder can be applied to the surface by an electrostatic spraying process.

Rejuvenation Process

Various embodiments relate to a method of rejuvenating a superhydrophobic surface. The superhydrophobic surface can be a surface according to any of the preceding embodiments. The super hydrophobic surface can be prepared according to any of the preceding embodiments. For example, the super hydrophobic surface can comprise a resin; and a plurality of superhydrophobic particles. Each superhydrophobic particle can have a three dimensional, nanostructured surface topology, defining a plurality of pores. At least a portion of the superhydrophobic particles can be embedded within the resin or chemically bonded to the resin so as to be surrounded by the resin. According to various embodiments, the resin does not fill the pores of the embedded superhydrophobic particles such that the three dimensional surface topology of the superhydrophobic particles is preserved. The method of rejuvenating a super hydrophobic surface can comprise of simply abrading the superhydrophobic surface to expose the embedded superhydrophobic particles.

Again, superhydrophobic powder grains, like superhydrophobic diatomaceous earth, are generally much lighter than resin grains of comparable size because of the superhydrophobic powder grain's high porosity and surface area. In addition, the superhydrophobic diatomaceous earth powder grains described in this invention are generally much smaller than the typical resin grains. For instance, resin grain sizes typically vary from about 30 microns to 100 microns in diameter, while superhydrophobic diatomaceous earth typically varies from 0.5 microns to 15 microns in diameter. This means that equal volumes of superhydrophobic diatomaceous earth and resin powder consist of considerably more SHDE grains and will contain much more resin by weight.

When a drop of water is surrounded by superhydrophobic silica powder very small powder grains can be somewhat sticky to the drop and can produce a thin film of such powder grains on the drop's surface. Such water drops covered with SH silica are called "water marbles." These water marbles generally will not combine with each other because of the repulsive effects of the SH powder. The same effect can occur to the curing powder resins according to various embodiments to form resin marbles. Each resin marble can be covered with a plurality of superhydrophobic particles. In some cases formation of resin marbles is desirable. Resin marbles are typically unable to be bonded to the substrate or with other resin marbles. For other applications, formation of resin marbles should be avoided by limiting the amount of superhydrophobic particles (for example, silica powder) blended with the resins.

To avoid or to reduce formation of resin marbles, the ratio of superhydrophobic particles to resin in the superhydrophobic coating can be selected from 1:1, 1:1.25, 1:1.5, 1:1.75, 1:2, 1:2.25, 1:2.5, 1:2.75, 1:3, 1:3.25, 1:3.5, 1:3.75, 1:4, 1:4.25, 1:4.5, 1:4.75, 1:5, 1:5.25, 1:5.5, 1:5.75, 1:6, 1:6.25, 1:6.5, 1:6.75, 1:7, 1:7.25, 1:7.5, 1:7.75, 1:8, 1:8.25, 1:8.5, 1:8.75, 1:9, 1:9.25, 1:9.5, 1:9.75, 1:10, 1:10.25, 1:10.5, 1:10.75, 1:11, 1:11.25, 1:11.5, 1:11.75, 1:12, 1:12.25, 1:12.5, 1:12.75, 1:13, 1:13.25, 1:13.5, 1:13.75, 1:14, 1:14.25, 1:14.5, 1:14.75, 1:15, 1:15.25, 1:15.5, 1:15.75, 1:16, 1:16.25, 1:16.5, 1:16.75, 1:17, 1:17.25, 1:17.5, 1:17.75, 1:18, 1:18.25, 1:18.5, 1:18.75, 1:19, 1:19.25, 1:19.5, 1:19.75, 1:20, 1:20.25, 1:20.5, 1:20.75, 1:21, 1:21.25, 1:21.5, 1:21.75, 1:22, 1:22.25, 1:22.5, 1:22.75, 1:23, 1:23.25, 1:23.5, 1:23.75, 1:24, 1:24.25, 1:24.5, 1:24.75, and 1:25 by volume. For example, according to certain preferred embodiments, the ratio of superhydrophobic particles to resin in the superhydrophobic coating can be between 1:8 and 1:15 by volume, corresponding to about 1:3 and 1:10 by weight. The ratio of superhydrophobic particles to resin can be between 1:1.5 and 1:5 by volume or about 1:4, by volume.

Ratios of superhydrophobic particles to resin in the superhydrophobic coating can also be expressed by weight. To avoid or to minimize formation of resin marbles, the ratio of superhydrophobic particles to resin in the superhydrophobic coating can be selected from 1:1, 1:1.25, 1:1.5, 1:1.75, 1:2, 1:2.25, 1:2.5, 1:2.75, 1:3, 1:3.25, 1:3.5, 1:3.75, 1:4, 1:4.25, 1:4.5, 1:4.75, 1:5, 1:5.25, 1:5.5, 1:5.75, 1:6, 1:6.25, 1:6.5, 1:6.75, 1:7, 1:7.25, 1:7.5, 1:7.75, 1:8, 1:8.25, 1:8.5, 1:8.75, 1:9, 1:9.25, 1:9.5, 1:9.75, 1:10, 1:10.25, 1:10.5, 1:10.75, 1:11, 1:11.25, 1:11.5, 1:11.75, 1:12, 1:12.25, 1:12.5, 1:12.75, 1:13, 1:13.25, 1:13.5, 1:13.75, 1:14, 1:14.25, 1:14.5, 1:14.75, 1:15, 1:15.25, 1:15.5, 1:15.75, 1:16, 1:16.25, 1:16.5, 1:16.75, 1:17, 1:17.25, 1:17.5, 1:17.75, 1:18, 1:18.25, 1:18.5, 1:18.75, 1:19, 1:19.25, 1:19.5, 1:19.75, 1:20, 1:20.25, 1:20.5, 1:20.75, 1:21, 1:21.25, 1:21.5, 1:21.75, 1:22, 1:22.25, 1:22.5, 1:22.75, 1:23, 1:23.25, 1:23.5, 1:23.75, 1:24, 1:24.25, 1:24.5, 1:24.75, and 1:25 by weight. For example, the ratio of superhydrophobic particles to resin in the superhydrophobic coating can be from about 1:3 to about 1:9 by weight.

The preferred ratios depend on both the resin grain sizes and the superhydrophobic powder grain sizes. For instance, if superhydrophobic particles having an average size of 10 microns was employed in conjunction with a resin having an average size of 50 microns, a preferred ratio of superhydrophobic particles to resin could be about 1:8 by weight. If the superhydrophobic particles were much smaller, for example, 1.0 micron diameter, and the resin was 50 microns, a preferred ratio of superhydrophobic particles to resin could be 1:20 by weight. In other words, if the superhydrophobic particles have a smaller diameter, then on either a weight basis or on a volume basis much less superhydrophobic would be needed to avoid or to reduce formation of resin marbles.

EXAMPLES

Example 1

DuPont's Vulcan Black thermal set dry resin powder was blended with superhydrophobic diatomaceous earth (SHDE)

particles. This blend was then electrostatically sprayed onto an electrically grounded substrate (usually a metal). The silica-based powders accept and hold an electrostatic charge very well, better in fact, than the dry resin powders themselves. Once the blended powder was electrostatically attached to the grounded substrate, the substrate was heated in an oven using a temperature that is on the low end of the powder resin's curing temperature range. For the thermal set Vulcan Black resin the curing temperature was 320 degrees Fahrenheit, which is about 20 degrees Fahrenheit less than a normal low temperature curing temperature. In general, the curing temperature can be 20 degrees Fahrenheit below the lowest manufacturer's suggested curing temperature.

SHDE acts as a slight thermal insulator. When blended SHDE is applied to the substrate, it will tend to inhibit substrate heating. Therefore, it is necessary, when using thermal set or thermal plastic powder resins, to preheat the substrate before curing, in order to insure good resin-to-substrate adhesion during curing. The preheating step consists of heating the coated substrate to a temperature slightly less than the low end of the resin curing temperature. A temperature of 20 degrees Fahrenheit below the manufacturer's lowest recommended curing temperature was employed. In the case of Vulcan Black (VB), a preheat temperature of 320 degrees Fahrenheit was used. The preheat temperature is held for a suitable amount of time such as 10 minutes. Once the substrate was preheated the oven temperature was raised to the normal curing temperature (400 degrees Fahrenheit for 20 minutes, for VB).

The heating of the substrate and precursor powder can be by any suitable method. Conductive or convective heating is possible, as is radiant heating, microwave (RF) heating, and possibly also nuclear heating could be used, among others. Since the substrate is already close to the curing temperature, an increase in temperature at this point readily increases the metal substrate temperature and allows the resin to sufficiently bond to the substrate.

Example 2

In the second variation, a two powder application step process was used. The dry resin powder, according to example 1, was electrostatically sprayed onto the substrate in a standard electrostatic powder coat process. Next, a SHDE/dry resin precursor powder blend was sprayed onto the substrate. Once both powder layers are electrostatically adhered to the substrate, the layers were cured together in the same manner as described previously. This second method provided good bonding to the substrate and increases overall coating durability while maintaining a high quality superhydrophobic surface and some abrasion resistance.

While these two application variations and associated set of steps reflect current processing steps, it is in no way to be considered the only way to coat the substrate. The precursor powder can be used and incorporated into many other powder coat processes.

If the substrate is not preheated before exposing the coating to the curing temperature, the thermal mass of the substrate and insulation attributes of SHP would inhibit the substrate from heating properly to the curing temperature before the resin cures. The result would be an unbonded SHP/resin film that would simply fall off the substrate.

A key feature of this process is the fact that the SHP is not actually chemically bonded to the curing resin. During the resin curing process the flowing resin dose not completely "wet" the superhydrophobic particles, such as superhydrophobic diatomaceous earth. In fact, the superhydrophobic particles actually can somewhat repel the curing resin. This keeps the pores of the superhydrophobic particles generally unclogged and full of air. But, some of the curing resin does flow into the porous nanotextured structure such as pores. Once cured, the resin that went into the pores mechanically holds the SHP in place, effectively bonding the superhydrophobic particles to and below the surface.

Results of Examples 1 and 2

Using the blended superhydrophobic powder coating techniques described in examples 1 and 2; both aluminum and steel plates were successfully coated along with small aluminum power-line segments.

Based on these results, it should be clear that any metal (especially electrically conductive metals), can be coated. Additionally, by using standard powder coating techniques of applying a conductive primer coating, paper, wood, cloth, plastics, etc. have been successfully powder coated and thus could be made superhydrophobic with our enhancements to such powder coatings.

Example 3

Superhydrophobic diatomaceous earth (SHDE) was blended with threel parts (by weight) of DuPont's thermal set resin Vulcan Black (VB)of to electrostatically coat a power line segment. First, the powerline was electrostatically sprayed with VB. Then, a blend of VB and SHDE, having a 3:1 volume ratio, was electrostatically sprayed onto the powerline.

The combined coatings were cured at 200 degrees Celsius for 30 minutes. The result was a well-bonded superhydrophobic surface that maintained superhydrophobic behavior even when the outer layers were abraded away. A Taber abrasion test according to ASTM D 4060, showed superhydrophobic behavior after as many as 400 (fully loaded) Tabor cycles.

Results from the Taber Abrasion test are summarized in Table 1.

TABLE 1

| Taber Cycles | Contact Angle with a drop of water |
| --- | --- |
| 0 | 165° |
| 10 | 160° |
| 50 | 158° |
| 100 | 158° |
| 200 | 155° |
| 300 | 153° |
| 400 | 151° |
| 450 | 135° |

Figure 1A:
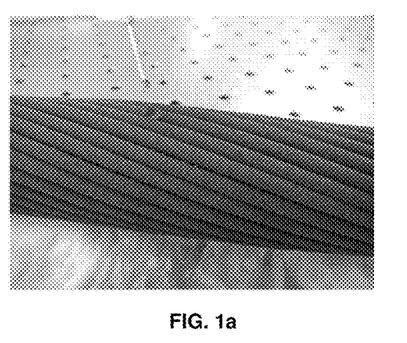
FIGS. 1a-1f are frames from a video demonstrating the superhydrophobicity of an aluminum power line coated according to one embodiment of the present invention.
Figure 1B:
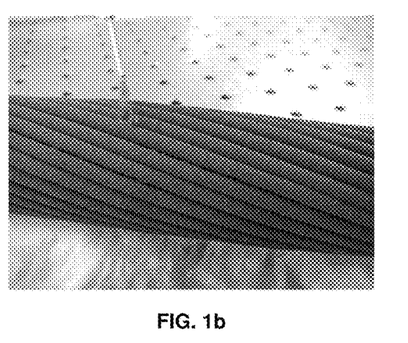
Figure 1C:
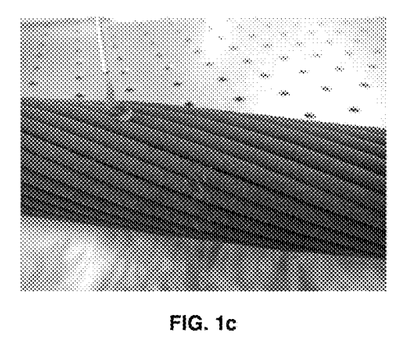
Figure 1D:
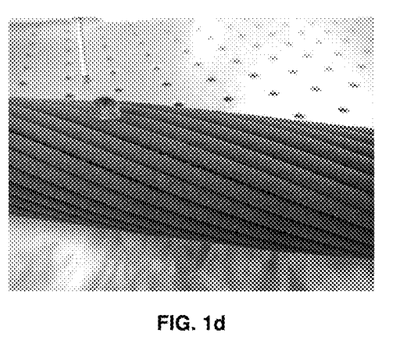
Figure 1E:
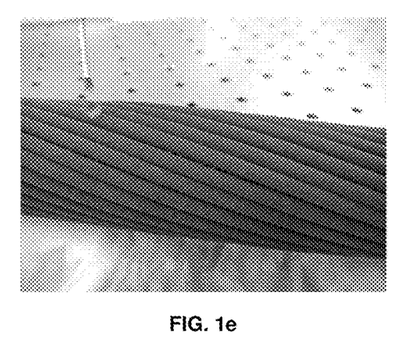
Figure 1F:
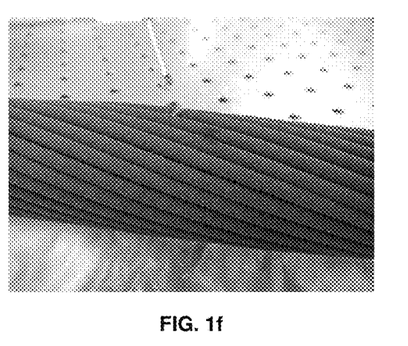

FIGS. 1a-1f are still frames taken from a video showing water droplets rolling off of the coated powerline. These still frames demonstrate that the powerline was successfully rendered superhydrophobic.

Example 4

A variety of powder blend combinations, comprising a resin and a plurality of superhydrophobic particles have been successfully made. These include polyester (TGIC) resins like Vulcan Black, Oil Black (From DuPont), and Safety Yellow (from Valspar), epoxy resins like PCM90133

Black Epoxy Powder from PPG, and fluoropolymer powder resins like PD800012 Powder Duranar AAMA2605 from PPG.

All of these resins were blended with SHDE and testing for superhydrophobic behavior. All of the above resins and associated blends of SHDE were able to be bonded to a variety of substrates (glass, wood, and aluminum) and exhibited contact angles in excess of 150 degrees. Tabor abrasion testing was done on coated aluminum plates coated with all the about resin/SHDE blends. Superhydrophobicity was maintained on these plates for Taber (minimal loading) cycles exceeding 100 cycles.

One powder blend combination comprised DuPont's thermal set resin Vulcan Black (VB) Resin and superhydrophobic diatomaceous earth (SHDE) at ratios of 3:1, and 4:1. It was discovered that as the ratio of Resin:SHDE increases (i.e. lower concentrations of SHDE) the degree of water repellency (i.e. contact angle) decreases, but some enhanced water repellency (over the bare resin) is expected at all SHDE concentrations (even very low concentrations). At the other extreme (i.e. as Resin:SHDE ratio approaches zero i.e. the blend is entirely SHDE), most of the SHDE powder did not get bonded to the coating, except at the interface of the SHDE layer and the first resin application layer. The result is a very superhydrophobic surface without a great deal of durability. That is, a small amount of abrasion will remove the surface bond SHDE. Once that's removed, the surface is no longer superhydrophobic.

Based on these results it can be reasonably concluded that a blend comprising as little as 5% SHDE by volume could result in good superhydrophobic behavior (contact angles of >150 degrees). As the blended proportion of SHDE increases, water repellency increases. The blending of SHDE with resin also creates a volumetric SH effect, in that removal of some coating material, by mild abrasion, exposes fresh (not fully clogged) SHDE material and thus the abraded surface remains SH.

Blends resulting in a good superhydrophobic behavior can have an amount of superhydrophobic diatomaceous earth within a range of from 1 to 90% by weight. Preferred blends can comprise from 10% to 30% SHDE by weight or from 10% to 20% SHP by weight. For purposes of this example the term "good superhydrophobic behavior" means that when the blend is applied to a substrate according to various embodiments the resulting super hydrophobic coating has a contact angle with a drop of water in a range of from 150 degrees to 175 degrees, and a roll-off angle in a range of from 0.1 degree to 15 degrees.

Example 5

Ultraviolet (UV) curable powder resins could be applied and blended the same way as thermal sets resins and thermal plastic resins except that the ultraviolet curable powder resins would use UV radiation instead of heat to cure. Since the silica-based superhydrophobic powder, according to various embodiments, readily transmits ultraviolet radiation, there would be no curing degradation encountered when blending SHDE with UV curable powders. UV curing would require the UV radiation to penetrate the sprayed resin layers far enough to cure all the resin layers. Since the superhydrophobic powders, according to various embodiments, transmit (i.e. are non-absorbing) UV radiation, any UV radiation that would cure these resin layers that didn't contain superhydrophobic powders, would also cure the same resin layers that do contain superhydrophobic powders.

The foregoing description of the preferred embodiments of the invention has been presented for purposes of illustration. The invention is not limited to the embodiments disclosed. Modifications and variations to the disclosed embodiments are possible and within the scope of the invention.

I claim:

1. A superhydrophobic coating, comprising:
a thermal set resin powder; and
a plurality of amphoteric superhydrophobic particles,
wherein each superhydrophobic particle comprises a porous silicate core having an outer surface, comprising a three dimensional, nanostructured surface topology, defining a plurality of pores, wherein each porous silicate core is hydrophilic, the superhydrophobic particles comprising a plurality of superhydrophobic regions on the surface of the silicate core comprising hydrophobic silanes bonded to the surface, and a plurality of hydrophilic regions on the surface comprising exposed portions of the silicate surface,
wherein at least a portion of the superhydrophobic particles are embedded within the thermal set resin so as to be surrounded by the resin, wherein the particles are covalently bonded to the thermal set resin via the hydrophilic silicate surface of the hydrophilic regions, and the resin does not bind to the hydrophobic silanes of the hydrophobic regions, and wherein the superhydrophobic particles are mechanically bonded to the thermal set resin by partial penetration of the pores by the resin;
wherein the pore volume of each porous core is less than 50% filled by the resin;
wherein the resin does not fill the pores of the embedded superhydrophobic particles such that the three dimensional surface topology of the superhydrophobic particles is preserved upon removal of adjacent portions of the resin.

2. The superhydrophobic coating of claim 1, wherein the resin is hydrophobic.

3. The superhydrophobic coating of claim 1, wherein the superhydrophobic particle comprises a hydrophobic coating, the hydrophobic coating conforming to the surface of the superhydrophobic particle so as to preserve the nanostructured surface topology.

4. The superhydrophobic coating of claim 3, wherein the superhydrophobic particle comprises a diatomaceous earth particle.

5. The superhydrophobic coating of claim 1, wherein the silicate is etched to provide the nanostructured surface topology.

6. The superhydrophobic coating of claim 1, wherein the diameter of the superhydrophobic particle is between 1-20 µm.

7. The superhydrophobic coating of claim 1, wherein the diameter of the superhydrophobic particles is between 10-20 µm.

8. The superhydrophobic coating of claim 1, wherein the ratio of superhydrophobic particles to resin is between 1:1 and 1:10, by volume.

9. The superhydrophobic coating of claim 1, wherein the ratio of superhydrophobic particles to resin is between 1:1.5 and 1:5, by volume.

10. The superhydrophobic coating of claim 1, wherein the ratio of superhydrophobic particles to resin is about 1:4, by volume.

11. A superhydrophobic coating, comprising:
a thermal set dry resin powder comprising resin particles;
a plurality of amphoteric superhydrophobic particles, wherein each superhydrophobic particle comprises a porous silicate core having an outer surface, comprising a three dimensional, nanostructured surface topology, defining a plurality of pores having pore openings wherein each porous silicate core is hydrophilic, the superhydrophobic particles comprising a plurality of superhydrophobic regions on the surface of the silicate core comprising hydrophobic silanes bonded to the surface, and a plurality of hydrophilic regions on the surface comprising exposed portions of the silicate surface, the diameter of the resin particles being larger than the pore openings of the superhydrophobic particles;

wherein after curing at least a portion of the superhydrophobic particles are embedded within the cured thermal set resin powder so as to be surrounded by and mechanically bonded to the resin by partial penetration of the pores by the resin;

wherein the pore volume of each porous core is less than 50% filled by the resin;

wherein the particles are covalently bonded to the thermal set resin via the hydrophilic silicate surface of the hydrophilic regions, and the resin does not bind to the hydrophobic silanes of the hydrophobic regions;

wherein the cured resin does not fill the pores of the embedded superhydrophobic particles such that the three dimensional surface topology of the superhydrophobic particles is preserved upon removal of adjacent portions of the resin.

12. The superhydrophobic coating of claim 11, wherein the thermal set resin is hydrophobic.

13. The superhydrophobic coating of claim 11, wherein the superhydrophobic particle comprises a diatomaceous earth particle.

14. The superhydrophobic coating of claim 11, wherein the silicate is etched to provide the nanostructured surface topology.

15. The superhydrophobic coating of claim 11, wherein the diameter of the superhydrophobic particle is between 1-20 µm.

16. The superhydrophobic coating of claim 11, wherein the diameter of the superhydrophobic particles is between 10-20 µm.

17. The superhydrophobic coating of claim 11, wherein the ratio of superhydrophobic particles to resin is between 1:1 and 1:10, by volume.

18. The superhydrophobic coating of claim 11, wherein the ratio of superhydrophobic particles to resin is between 1:1.5 and 1:5, by volume.

19. The superhydrophobic coating of claim 11, wherein the ratio of superhydrophobic particles to resin is about 1:4, by volume.

20. The superhydrophobic coating of claim 11, wherein the resin particles are no more than 20 times the diameter of the of the superhydrophobic particles.

* * * * *